April 18, 1939.   G. REICHERTER   2,154,823
HARDNESS TESTING MACHINE
Filed Jan. 15, 1937    3 Sheets-Sheet 1

Inventor:

Patented Apr. 18, 1939

2,154,823

UNITED STATES PATENT OFFICE 2,154,823

HARDNESS TESTING MACHINE

Georg Reicherter, Esslingen-on-the-Neckar, Germany

Application January 15, 1937, Serial No. 120,764
In Germany January 21, 1936

3 Claims. (Cl. 265—12)

This invention relates to improvements in hardness testing machines in which the impressions produced by an intruding body in a sample of the material to be tested are measured by a microscope attached to the machine.

In the hitherto known machines of this kind the test load is transferred by a charge lever, linked to the upper part of the machine frame, on to a press-stamp guided to slide longitudinally in a vertical guide of the upper part of the machine and carrying at its lower end the intruding body as, for instance, a steel ball or a diamond. The microscope is fixed in a bracket linked either to the front wall of the upper part so as to rotate about a horizontal axis or linked to a side wall of the machine frame so as to rotate about a vertical axis. For testing, the microscope is by turning the bracket conducted over the impression to be tested, i. e. into the line of action of the intruding body.

These known hardness testing machines present the drawback that the rotation of the microscope can only be effected after the sample has been lowered to a degree corresponding at least to the height of the microscope, that is to say after the supporting table has been displaced to a considerable degree.

By displacing the supporting table before each measurement the testing operation is made troublesome and lengthy more particularly as after the rotation of the microscope—for the purpose of coarse adjustment—the supporting table must be displaced anew and only afterwards the exact adjustment can be effected at the microscope itself.

A further drawback of the known hardness testing machines consists therein that in cases, in which during the production of a testing impression the sample must be jammed between the supporting table and an abutment of the machine the sample must be released before the beginning of the measurement in order to be able to bring the microscope between the intruding body and the sample. This often results, especially in the case of long samples far extending over the supporting table, in the sample by mistake being displaced out of its original position when the supporting table is displaced, whereby the testing impression is removed out of the field of vision of the microscope. Consequently the sample must be returned into its prior position with great loss of time and then must be held by hand on the supporting table during the whole measuring operation, that is during the coarse and fine adjustment and during reading off the scale. The measuring of the testing impression is hereby extraordinarily impeded and the result of the measurement is often inexact.

The object of the present invention is to do away with these drawbacks by providing a hardness testing machine in which the testing impression can be measured at once after it has been made without the necessity of previously displacing the supporting table or releasing the sample.

This object is obtained according to the invention by making the carrier of the intruding body rotatable or crosswise displaceable whereby one is able to dispose the microscope from the beginning in the line of action of the test-pressure.

The invention is illustrated by way of example in the annexed drawings of which

Figure 1:
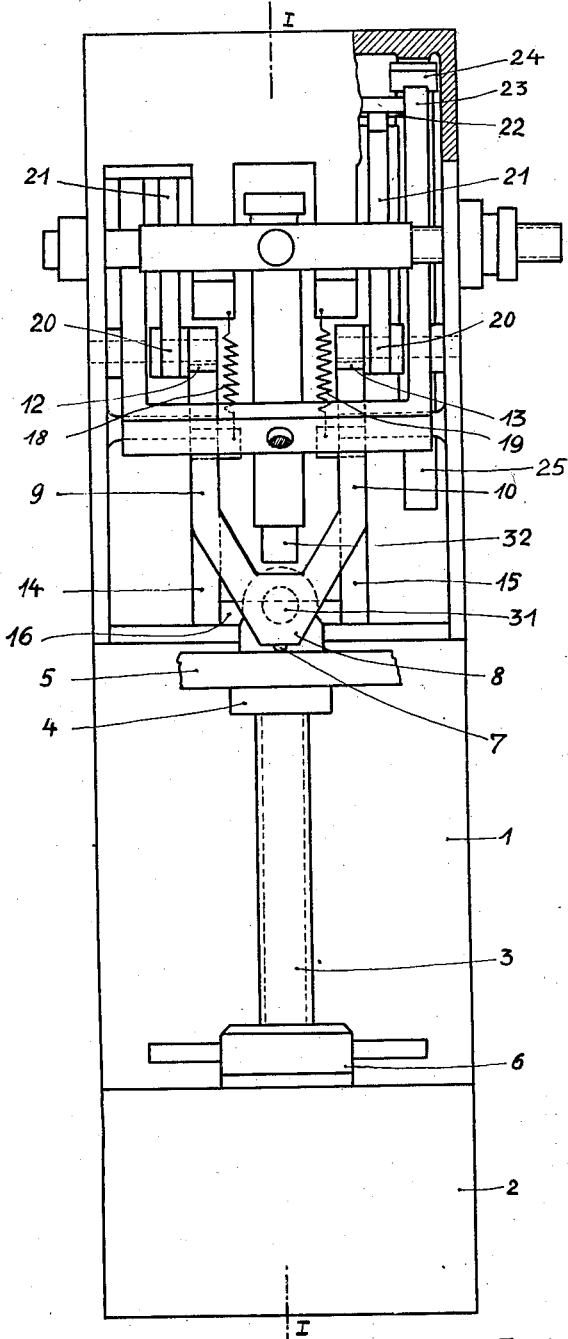
Fig. 1 is a front elevation of the testing machine.

In the drawings 1 is the frame of a hardness testing machine in the lower part 2 of which a screw spindle 3 is journaled in the well-known manner, which spindle carries at its top end a supporting table 4 for the sample 5 and may be adjusted as to height by a hand wheel 6. 7 is an intruding body (steel ball, diamond or the like) which is fastened in a U-shaped or similar bifurcated member 8. The legs 9, 10 are provided at their ends with knife-edges 11, 11 of triangular cross-section. These knife-edges engage into bearings 12, 13 provided at the ends of a likewise bifurcated draw-rod 16 preferably extending at an angle of 45° in view of the line of action of the intruding body toward the back-side of the frame of the machine downwards and at its lower end turned aside from the member 8 being subjected to tension by a weight 17 or a spring.

The member 8 is held fast so as to rotate in the bearings 12, 13 of the draw-rod 16 by springs 18, 19 attached to the upper part of the machine frame and preferably engaging the rear-side of the member 8.

To the ends of the legs 14, 15 of the draw-rod 16 stays 21 are linked which are rotatable about a horizontal axis 20 and the outer ends of which form knife-edges. The stays 21 engage with these edges bearings 22 of a link 23 which is journaled coaxially with the axis 20 of the stay 21 at the side walls of the machine-frame.

An abutment 24 serves for limiting the swinging motion of the link 23. The abutment 24 is guided in a circular slot 25 of the upper part of the machine and may be fixed in this slot in any desired position.

At the rear side of the member 8 a cam 27 of triangular cross-section is provided on each of the legs 9, 10. This cam slides on corresponding displacement of the link with its upper side face 28 along the upwards slanting wedge face 29 of an abutment 30 attached to the machine frame and thereby the cam turns the member 8 out of its operation position forwards.

On swinging the member 8 back into its operative position a buffer 31 resiliently attached to the machine frame serves as an abutment.

Between the legs 9, 10 of the member 8 a microscope 32 is disposed in the frame coaxially to the line of action of the intruding body 7. This microscope may be displaced by means of micrometric screws or the like upwards and sideways.

Figure 2:
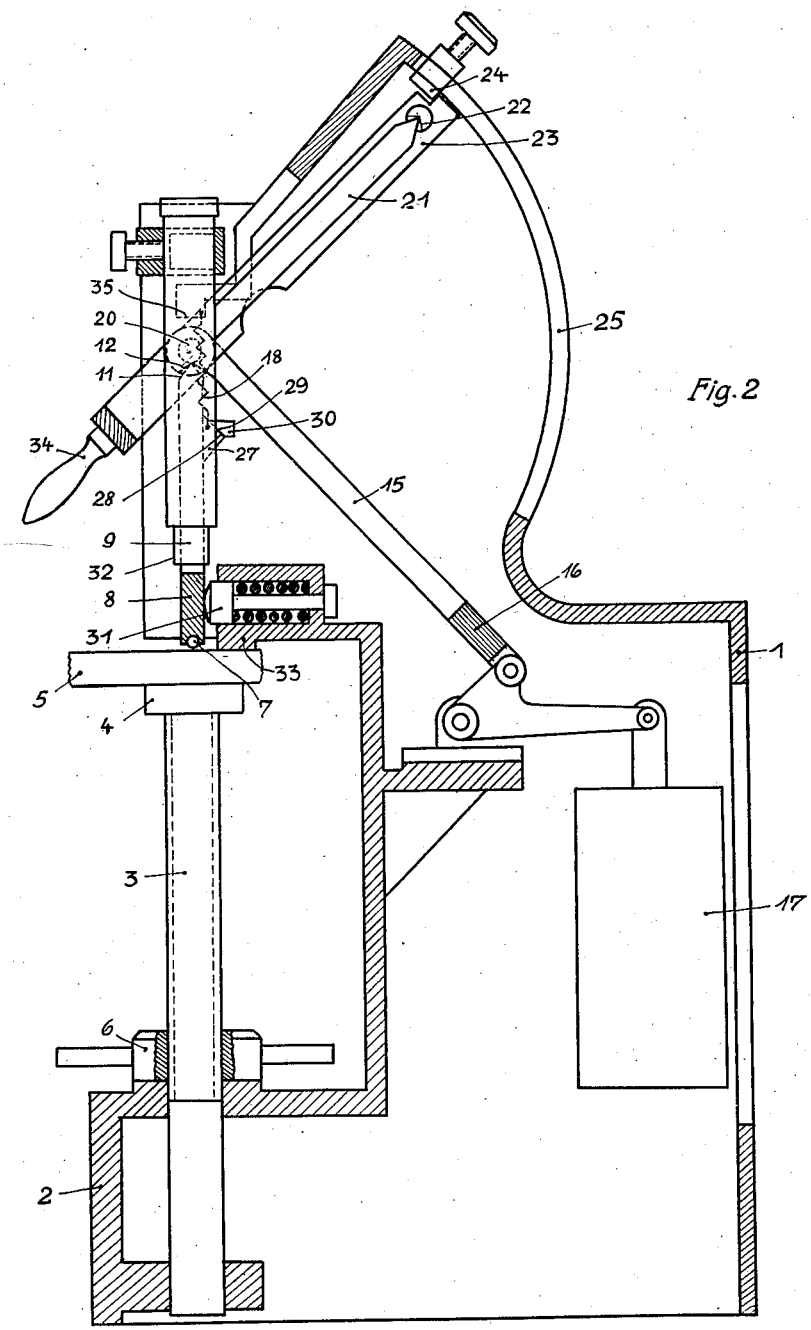
Fig. 2 is a longitudinal cross-section on the line I—I of Fig. 1, the intruding body being in operative position.
Figure 3:
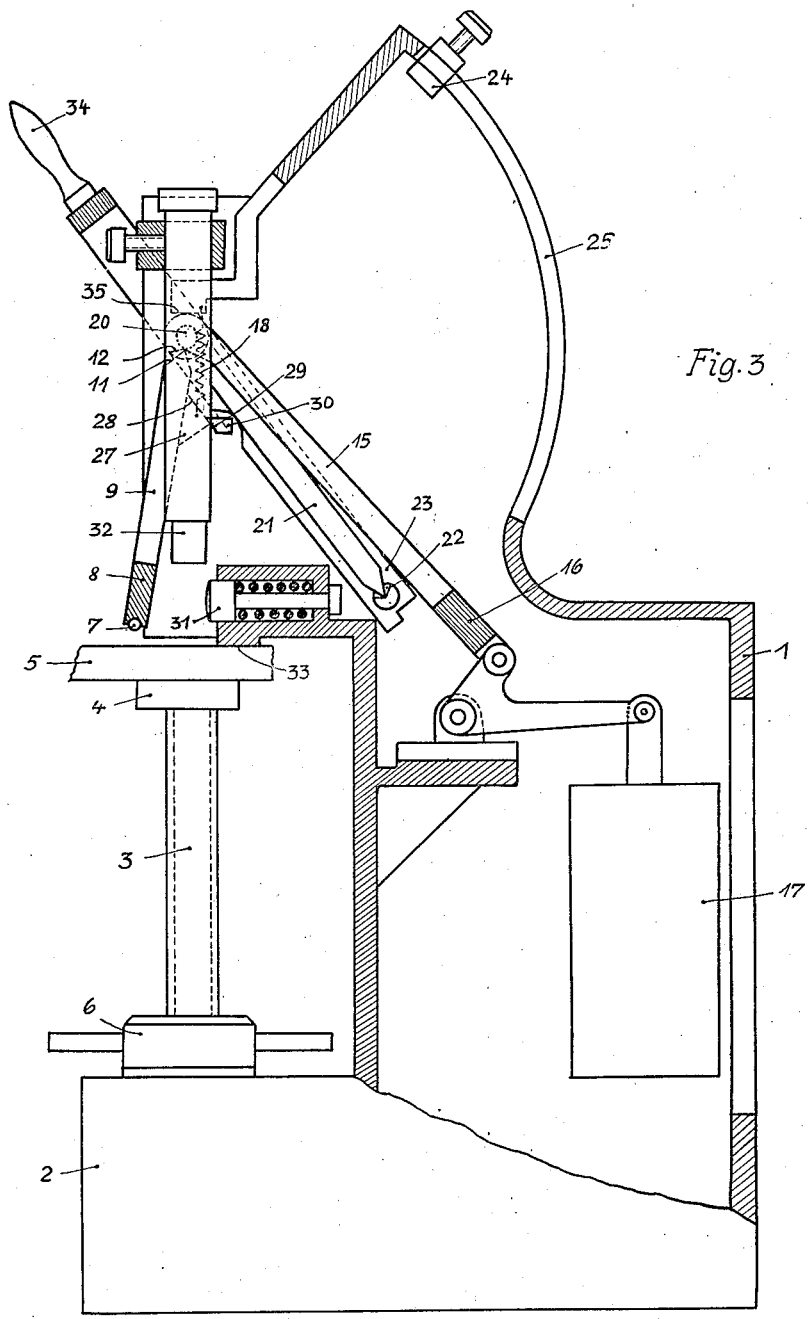
Fig. 3 is a longitudinal cross-section on the line I—I of Fig. 1, the intruding body being turned out of its line of action.

For testing the hardness of a material, the sample 5 is placed upon the supporting table 4 and, if required, pressed by means of the screw spindle 3 against the abutment 33 of the upper part of the machine. From the position shown in Fig. 3 now the link 23 is swung by means of the handle 34 attached thereto to such an extent that the member 8 is in vertical position above the sample 5. This takes place as soon as the link 23 coincides with the draw-rod 16. Now when the link 23 is farther swung, for instance, into the position shown in Fig. 2, the force of tension exerted by the weight 17 or a spring on the draw-rod 16 is distributed over the stay 21 and the member 8. The latter presses the intruding body with the force apportioned to it into the sample.

Now when the link 23 is swung back again, the member 8 as soon as the link has reached a position below the draw-rod 16 is drawn upwards. It slides hereby with the upper face 28 of the cam 27 along the slanting wedge face 29 of the abutment 30 upwards up to an abutment 35 of the machine frame and at the same time it is swung out forward.

When the member 8 is swung out, the test impression can be immediately, viz. without displacing the supporting table 4 or releasing the sample, measured with the microscope 32 which is already disposed in the line of action of the intruding body.

I claim:

1. In a statically acting hardness testing machine, the combination of a microscope, a body adapted to intrude into a sample of the material to be tested, a U-shaped member carrying on its crossbar the intruding body and being adapted to be swung into and to be removed out of the field of vision of the microscope, the latter being arranged between the legs of the said U-shaped member; springs attached to the upper part of the machine frame and to the backside of the said member, a bifurcated drawrod drawn downwards by a suitable force, bearings formed at the free ends of the drawrod, the free ends of the said U-shaped member being held by the said springs in the said bearings of the said drawrod, a stay rotatable about a horizontal axis linked to the upper end of the said drawrod, and a lever connected with the said stay and coaxially linked to the machine frame.

2. In a statically acting hardness testing machine, the combination of a microscope, a body adapted to intrude into a sample of the material to be tested, a U-shaped member carrying on its crossbar the intruding body and being adapted to be swung into and to be removed out of the field of vision of the microscope, the latter being arranged between the legs of the said U-shaped member; springs attached to the upper part of the machine frame and to the backside of the said member, a bifurcated draw-rod linked to the frame of the machine and drawn downwards by a suitable force, bearings formed at the free ends of the draw-rod, the free ends of the said U-shaped member being held by the said springs in the said bearings of the draw-rod, a stay rotatable about a horizontal axis linked to the upper end of the said draw-rod, and a lever connected with the said stay and coaxially linked to the machine frame, the swinging movement of the lever being limited by an abutment guided in a circular slot of the upper part of the machine frame and capable of being fixed therein.

3. In a statically acting hardness testing machine, the combination of a microscope, a body adapted to intrude into a sample of the material to be tested, a U-shaped member carrying on its crossbar the intruding body and being adapted to be swung into and to be removed out of the field of vision of the microscope, the latter being arranged between the legs of the said U-shaped member; springs attached to the upper part of the machine frame and to the backside of the said member, a bifurcated draw-rod linked to the frame of the machine and drawn downwards by a suitable force, bearings formed at the free ends of the draw-rod, the free ends of the said U-shaped member being held by the said springs in the said bearings of the draw-rod, a stay rotatable about a horizontal axis linked to the upper end of the said draw-rod, a lever connected with the said stay and coaxially linked to the machine frame, cams of triangular section at the backside of the U-shaped member, a slanting wedge face on the machine frame co-operating with said cams, and an abutment attached to the machine frame to confine the movement of the U-shaped member.

GEORG REICHERTER.